3,085,882
NOVEL CONFECTIONERS' FAT
Chester M. Gooding, Westfield, and Cornelius A. Cravens, New Providence, N.J., assignors to Corn Products Company, New York, N.Y., a corporation of Delaware
No Drawing. Filed July 25, 1960, Ser. No. 44,863
12 Claims. (Cl. 99—118)

This invention relates to a novel confectioners' fat and to a method of producing same.

Confectioners' fats, also known as hard butters, are composed, at the present time, of the so-called lauric-type fats. These fats while providing eminently suitable cocoa butter replacements are subject to the vicissitudes of foreign importation, artificial trade restrictions, crop yields as affected by unfavorable seasonal climatic diversions from normal conditions as well as by insect and other infestations at the growing source. Furthermore, a manufacturer of lauric-type confectioners' fats must plan to accumulate inventories much in advance of his requirements. In a period of lower-than-anticipated selling prices of confectioners' fats, the unexpected demand for his product may leave him in serious short-supply with no immediate means for raw material replacement.

The lauric-type hard butters based upon coconut, babassu, palm kernel, cohune nut or other tropic fats are susceptible to hydrolysis if adventitiously contaminated with fungal enzymes whereby objectionable flavors may develop under unfavorable storage conditions such as at high humidities and temperatures. A reduction in the proportion of the lauric-type fats in a confectioners' fat is desirable in order to increase resistance to this latter type of deterioration.

It is therefore an object of this invention to provide novel confectioners' fats which are more resistant to flavor deterioration than presently used confectioners' fats. It is another object of this invention to provide novel fat compositions which have improved shelf life, particularly in warm weather. It is a further object of this invention to provide confectioners' fats having less lauric-type fats than present hard butters. It is a further object to provide processes for producing the novel confectioners' fats of this invention. These and further objects will become apparent from the following detailed explanation of the invention.

According to this invention there is provided a novel confectioners' fat which comprises a component comprising an ester-interchanged lauric-type fat and a $C_{18}$-type fat, said component having an iodine value less than about 15 blended with a selectively partially hydrogenated fat component of the $C_{18}$-type fat having an iodine value of not less than about 60.

This invention also provides for a process of producing these novel confectioners' fats which comprise reacting a lauric-type fat with a hardened $C_{18}$-type fat to produce an ester-interchanged fat having an iodine value of less than about 15 and then blending said ester-interchanged fat with a selectively partially hydrogenated $C_{18}$-type fat having an iodine value of no less than about 60.

Thus according to this invention we have found that it is possible to effect a reduction of the amount of the lauric-type fat required in a confectioners' fat by first effecting a preliminary fortification of the lauric-type fat in terms of its physical characteristics through reaction of the lauric-type fat with a hardened $C_{18}$-type fat having an iodine value of less than about 40. The hardened $C_{18}$-type fats which may be employed in our composition are illustrated by such fats as cottonseed oil, cottonseed stearine, soya oil, peanut oil, etc. The fortified confectioners' fats thus produced have an iodine value of less than about 15 and a Wiley melting point of about 95° to 110° F. All melting points in this application are Wiley melting points. The fortified confectioners' fat is then blended with a $C_{18}$-type fat which has been partially hydrogenated under highly selective conditions to an iodine value of no lower than about 60. The final product obtained is a fat which has a melting point of about 98–115° F. and an iodine value of about 15–30. Thus, the proportion of lauric or tropic fat in our new hard butter is substantially reduced by a combined and sequential use of a saturated $C_{18}$-type fat of less than about 40 iodine value through chemical reaction or ester-interchange with the lauric fat followed, as a second step, by physical admixture with the same or another $C_{18}$-type fat having an iodine value of no less than 60, this latter fat having been subjected to partial and highly selective hydrogenation. In general, the selective hydrogenation is employed to reduce the iodine value to below about 80 and preferably below 75 and the resulting partially hydrogenated fat will contain only the homologous esters of the mono-unsaturated fatty acid, oleic acid. It is preferred that the fat be entirely free of di-unsaturated and polyunsaturated acid esters but it may contain small amounts of the latter without seriously affecting the physical properties of the new hard butter.

Generally the compositions of our invention will vary from about 85% to about 55% lauric-type fats and from about 15% to about 45% of the $C_{18}$-type fat.

It is also within the purview of our invention to react separate fractions of the lauric-type fat with different $C_{18}$-type fats to produce different ester-interchanged fats and to then blend these fats with the same or different selectively hydrogenated $C_{18}$-type fat.

The following examples are illustrative of our invention and it will be apparent to those skilled in the art that many variations of these examples are possible.

EXAMPLE I 85 parts of saturated palm kernel fat and 15 parts of saturated cottonseed stearine are subjected to ester-interchange by known procedures such as by heating in the presence of sodium methoxide catalyst. The product is refined by water-washing. This provides the portion of the new hard butter in which the lauric fat is reduced in amount by chemical reaction with a $C_{18}$-type fat.

Another $C_{18}$-type fat, in this case corn oil, is hydrogenated under highly selective conditions to an iodine value of 66.0. This provides the portion of $C_{18}$-type fat for physical admixture with the reacted portion described in the first part of this example.

65 parts of the reacted portion are mixed with 35 parts of the hydrogenated portion to provide a confectioners' fat containing only 55¼% lauric fat.

The fat compositions had the properties shown in Table I below.

Table I

| | M.P. | S.P. | I.V. | S.C.I., °F. | | | | |
|---|---|---|---|---|---|---|---|---|
| | | | | 50° | 70° | 80° | 92° | 102° |
| Reacted Portion: (1) 85 pts. Satd. Palm Kernel, 15 pts. Satd. Cottonseed Stearine | 102.6 | 34.6 | 1.0 | 67.9 | 58.9 | 49.3 | 21.1 | 0.5 |
| Hydrogenated Portion: (2) Partially hydgd. Corn Oil | 107.0 | 33.0 | 66 | 60.1 | 46.0 | 39.9 | 21.8 | 8.0 |
| Blended Product: (3) #1—65 parts, #2—35 parts | 103.0 | 33.1 | 23.0 | 62.0 | 48.6 | 36.1 | 12.0 | 1.6 |

EXAMPLE II 73 parts of saturated coconut oil and 27 parts of saturated cottonseed stearine are subjected to ester-interchange as described in Example I.

Separately, cottonseed oil is hydrogenated under highly selective conditions to an iodine value of 60 and a blend is prepared employing 55 parts of the rearranged product with 45 parts of the separately hydrogenated but unrearranged cottonseed oil.

The fat compositions had the properties shown in Table II below.

Table II

| | M.P. | S.P. | I.V. | S.C.I., °F. | | | | |
|---|---|---|---|---|---|---|---|---|
| | | | | 50° | 70° | 80° | 92° | 102° |
| Reacted Portion: (1) 73 pts. Satd. Coconut Oil, 27 pts. Satd. Cottonseed Stearine | 104.0 | 35.3 | 3.0 | 63.9 | 52.1 | 44.0 | 21.8 | 3.5 |
| Hydrogenated Portion: (2) Partially Hydrogenated Cottonseed Oil | 106.0 | 32.1 | 60.0 | 53.5 | 36.8 | 29.7 | 14.2 | 1.5 |
| Blended Product: (3) #1—55 parts, #2—45 parts | 103.6 | 32.3 | 28.3 | 54.2 | 39.6 | 30.4 | 12.9 | 2.1 |

Table III

| | M.P. | S.P. | I.V. | S.C.I., °F. | | | | |
|---|---|---|---|---|---|---|---|---|
| | | | | 50° | 70° | 80° | 92° | 102° |
| Blended Product | 104.0 | 34.3 | 22.8 | 57.6 | 43.3 | 33.7 | 13.4 | 1.8 |

EXAMPLE III

To 65 parts of the reacted portion of Example 2 was added 35 parts of soybean oil which had been selectively hydrogenated to an iodine value of 67.6 (M.P. 105.3—Wiley). The blended product had the properties shown in Table III.

EXAMPLE IV

To illustrate how greater resistance to softening at summer temperatures may be achieved, a reacted portion similar to that of Example II may be blended with a second reacted portion in which the $C_{18}$-type fat is increased. The final blended product comprises 3 components. The fat compositions had the properties shown in Table IV below:

Table IV

| | M.P. | S.P. | I.V. | S.C.I., °F. | | | | |
|---|---|---|---|---|---|---|---|---|
| | | | | 50° | 70° | 80° | 92° | 102° |
| Reacted Component: (1) 72 pts. Satd. Coconut oil, 28 pts. Satd. Cottonseed stearine | 104.5 | 35.2 | 0.7 | 64.1 | 54.1 | 45.6 | 21.3 | 4.5 |
| Reacted Component: (2) 63½ pts. Satd. Coconut oil, 36½ pts. Satd. Cottonseed Stearine | 109.8 | 36.2 | 1.7 | 66.9 | 59.2 | 52.8 | 32.7 | 13.7 |
| Hydrogenated Component: (3) Partially Hydgd. Soybean Oil | 109.0 | 34.1 | 66.4 | 60.3 | 46.7 | 39.5 | 21.2 | 7.0 |
| Blended Product: (4) #1—30 parts, #2—35 parts, #3—35 parts | 106.2 | 34.4 | 23.9 | 58.9 | 16.9 | 38.7 | 19.3 | 5.8 |

In addition to the foregoing advantageous features of our new confectioners' fat, we have also discovered that it is remarkably tolerant to the presence of cocoa fat. Ordinarily, confectioners' fats must be guarded against contamination by cocoa fat because of the latter's reluctance to undergo tempering under conditions normally employed in the tempering of confectioners' fats. Now, tempering, being a crystallization phenomenon, can be studied by dilatometric means, a method which gives quantitative data on an otherwise empirical procedure. The dilatometric method employed by us to reveal the unexpected compatibility of our new confectioners' fats and cocoa fat was that of Fulton et al. (Jl. Amer. Oil Chem. Soc. 31, 98 (1954)) except that the values for SCI are those observed after 24 hours at each temperature. This compatibility is shown in Table V below.

Table V

| | M.P. | S.P. | I.V. | S.C.I., ° F. | | | | |
|---|---|---|---|---|---|---|---|---|
| | | | | 50° | 70° | 80° | 92° | 102° |
| 1. Product similar to that of Example 1 | 101.8 | 31.5 | 23.6 | 64.3 | 53.2 | 39.8 | 18.4 | 4.0 |
| 2. Cocoa fat | 82.9 | 26.8 | 37.3 | 72.9 | 51.6 | 12.4 | 0.0 | |
| 3. 90 parts (1), 10 parts (2) | 101.2 | | | 62.4 | 48.5 | 32.9 | 14.5 | 4.3 |

Thus, it appears that our new confectioners' fats are capable of substantially maintaining their content of solid fat at temperatures above those at which cocoa butter is completely melted even when the latter is present in significant proportions. The importance of this revelation lies in the fact that confectioners' coatings containing a major proportion of confectioners' fat may be up-graded in color and in flavor by the permissible use of high-fat cocoa powder and even a proportion of chocolate liquor of the usual approximately 50% cocoa butter content.

Having thus provided a written description of the present invention and provided specific examples thereof, it should be understood that no undue restrictions or limitations are to be imposed by reason thereof but that the present invention is defined by the appended claims.

We claim:

1. An edible fat composition having an iodine value of at least about 15 comprising a component having an iodine value less than about 15 comprising an ester-interchanged lauric-type fat and $C_{18}$-type fat, blended with at least about 15% of a selectively partially hydrogenated fat component of a $C_{18}$-type fat having an iodine value of not less than 60.

2. The product of claim 1 in which the ester-interchanged component has a Wiley melting point of about 95° to about 110° F.

3. The fat composition of claim 1 in which the partially hydrogenated component is soybean oil of an iodine value of 60–75.

4. The fat composition according to claim 1 in which the $C_{18}$-type fat of the ester-interchanged component is cottonseed stearine, hydrogenated to an iodine value of less than about 40.

5. An edible fat composition having an iodine value of at least about 15 comprising a component having an iodine value less than about 15 comprising an ester-interchanged lauric-type fat and a $C_{18}$-type fat having an iodine value of less than about 40, blended with at least about 15% of a selectively partially hydrogenated fat component of a $C_{18}$-type fat having an iodine value of no less than 60.

6. An edible confectioners' fat having an iodine value of at least about 15 comprising an ester-interchanged component of a lauric-type fat and a $C_{18}$-type fat having a Wiley melting point of about 95° to 110° F., blended with at least about 15% of a selectively partially hydrogenated fat component of a $C_{18}$-type fat having an iodine value of no less than about 60.

7. An edible fat composition having a melting point of about 98° to about 115° F. and an iodine value of about 15 to about 30, comprising an ester-interchanged component of a lauric-type fat with a $C_{18}$-type fat, said interchanged component having an iodine value less than about 15, blended with at least about 15% of a selectively partially hydrogenated fat component of a $C_{18}$-type fat, said partially hydrogenated fat having an iodine value no less than 60.

8. An edible fat composition having a melting point of about 98 to about 115° F., and an iodine value of about 15 to about 30, comprising an ester-interchanged component of a lauric-type fat with a $C_{18}$-type fat, said interchanged component having an iodine value less than about 15 and a melting point of about 95 to 110° F., blended with at least about 15% of a selectively partially hydrogenated fat component of a $C_{18}$-type fat, having an iodine value of about 60–75, said ester-interchanged component varying from about 85 to about 55% of the composition and said partially hydrogenated fat component varying from about 15 to about 45% of said composition.

9. An edible confectioners' fat composition having an iodine value of at least about 15 comprising at least one ester-interchanged component of a lauric-type fat and a $C_{18}$-type fat having an iodine value of less than about 15, blended with at least about 15% of a selectively partially hydrogenated fat component of a $C_{18}$-type fat having an iodine value of no less than 60.

10. A process of producing an edible confectioners' fat having an iodine value of at least about 15% comprising reacting a lauric-type fat with a hardened $C_{18}$-type fat to produce an ester-interchanged fat having an iodine value of less than about 15 and then blending said ester-interchanged fat with at least about 15% of a selectively partially hydrogenated $C_{18}$-type fat having an iodine value of no less than about 60.

11. A process of producing an edible confectioners' fat which comprises reacting a lauric-type fat with a saturated $C_{18}$-type fat to produce an ester-interchanged fat having an iodine value of less than 15 and a melting point of about 95 to 110° F. and then blending said ester-interchanged fat with at least about 15% of a selectively partially hydrogenated $C_{18}$-type fat having an iodine value of no less than about 60 thereby producing a confectioners' fat having a melting point of at least about 98° F. and an iodine value of at least about 15.

12. A process of producing an edible confectioners' fat having a melting point of about 98° to about 115° F. and an iodine value of about 15 to about 30, which comprises reacting a lauric-type fat with a saturated $C_{18}$-type fat to produce an ester-interchanged fat having an iodine value of less than 15 and a melting point of about 95 to about 110° F., said $C_{18}$-type fat having an iodine value of less than 40, and then blending said ester-interchanged fat with at least about 15% of a selectively partially hydrogenated $C_{18}$-type fat having an iodine value of from about 60 to about 75.

References Cited in the file of this patent

UNITED STATES PATENTS 2,726,158    Cochran et al.    Dec. 6, 1955
2,936,238    Weiss    May 10, 1960